(12) United States Patent
Oka

(10) Patent No.: US 11,391,350 B2
(45) Date of Patent: Jul. 19, 2022

(54) BALL SCREW

(71) Applicant: NSK LTD., Tokyo (JP)

(72) Inventor: Keitaro Oka, Fujisawa (JP)

(73) Assignee: NSK LTD., Tokyo (JP)

( * ) Notice: Subject to any disclaimer, the term of this patent is extended or adjusted under 35 U.S.C. 154(b) by 51 days.

(21) Appl. No.: 17/050,043

(22) PCT Filed: Apr. 22, 2019

(86) PCT No.: PCT/JP2019/017059
§ 371 (c)(1),
(2) Date: Jan. 21, 2021

(87) PCT Pub. No.: WO2019/208510
PCT Pub. Date: Oct. 31, 2019

(65) Prior Publication Data
US 2022/0090659 A1    Mar. 24, 2022

(30) Foreign Application Priority Data
Apr. 24, 2018 (JP) .............................. JP2018-083390

(51) Int. Cl.
*F16H 25/20* (2006.01)
*F16H 25/22* (2006.01)
*F16H 25/24* (2006.01)

(52) U.S. Cl.
CPC ......... *F16H 25/2223* (2013.01); *F16H 25/24* (2013.01)

(58) Field of Classification Search
CPC .............................. F16H 25/2223; F16H 25/24
See application file for complete search history.

(56) References Cited

U.S. PATENT DOCUMENTS

2008/0127763 A1*  6/2008  Minakuti ............ F16H 25/2214
                                                    74/424.87
2012/0174691 A1*  7/2012  Yamada .............. F16H 25/2261
                                                     74/89.23
(Continued)

FOREIGN PATENT DOCUMENTS

JP     2003-307263 A    10/2003
JP     2004-36789 A      2/2004
(Continued)

OTHER PUBLICATIONS

Communication dated Jul. 8, 2021 issued by the European Patent Office in application No. 19793968.9.
(Continued)

*Primary Examiner* — Zakaria Elahmadi
(74) *Attorney, Agent, or Firm* — Sughrue Mion, PLLC

(57) ABSTRACT

A ball screw includes: a screw shaft (10) having a spiral first screw groove (11) formed in an outer peripheral surface thereof; a nut (20) disposed on the periphery of the screw shaft (10) and having a spiral second screw groove (21) formed in an inner peripheral surface thereof; a plurality of balls (30) accommodated in a rolling path (23) formed by the opposing screw grooves (11, 21); and a circulation piece (40) that forms a ball return passage (42) for circulating the plurality of balls (30) through one circuit or less of the rolling path (23). Traffic variation is made to be small by determining the maximum angle of inclination (α) of the ball return passage (42) in an expression using the lead (L), the ball diameter (Da), and the lead angle (β).

2 Claims, 9 Drawing Sheets

(56) References Cited

U.S. PATENT DOCUMENTS

2018/0003275 A1\* 1/2018 Yoshida ............... B62D 5/0424
2018/0073616 A1 3/2018 Kawaguchi

FOREIGN PATENT DOCUMENTS

| JP | 2004-108395 A | 4/2004 |
|----|---------------|--------|
| JP | 2012-47333 A | 3/2012 |
| JP | 2016-217402 A | 12/2016 |

OTHER PUBLICATIONS

International Search Report (PCT/ISA/210) dated Jun. 11, 2019 by the International Searching Authority in counterpart International Patent Application No. PCT/JP2019/017059.
Written Opinion (PCT/ISA/237) dated Jun. 11, 2019 by the International Searching Authority in counterpart International Patent Application No. PCT/JP2019/017059.

\* cited by examiner

BALL SCREW

TECHNICAL FIELD

The present invention relates to a ball screw. More specifically, the present invention relates to an internal circulation type ball screw to circulate a plurality of balls that pass through a rolling path formed between a screw shaft and a nut.

BACKGROUND ART

The ball screw is applied to a conveyance device or a table feeding device of a machine tool, an industrial machine, or the like, and a steering device of an automobile as a device that realizes precise positioning. Among the internal circulation type ball screws, an internal deflector type ball screw using a circulation internal deflector has an advantage of being the most compact among various ball screws.

Patent Document 1 discloses a ball screw device which includes: a screw shaft that is disposed and rotates in a horizontal state; a nut externally fitted to the screw shaft; a plurality of balls that are rollably filled in a track formed by ball rolling grooves of the screw shaft and the nut; and a plurality of circulation internal deflectors that are provided in the nut and are provided with ball return grooves. The plurality of circulation internal deflectors are arranged in a row in an axial direction of the nut, while phases of the circulation internal deflectors are substantially upward, so that a gap is always formed in the ball return groove, so as to prevent clogging of the balls, prevent fluctuation in an operating torque of a ball passing period, and prevent problems caused by the fluctuation of the operating torque.

Patent Document 2 discloses a ball screw, in which elastic bodies are interposed between balls, and in which a spring constant of the elastic bodies in a ball entering-exiting direction, which acts between a ball located at one end and a ball located at the other end of a circulation portion, is defined, so as to absorb entering-exiting fluctuation of the balls in the circulation portion.

PRIOR ART DOCUMENT

Patent Document

Patent Document 1: JP-A-2012-47333
Patent Document 2: JP-A-2004-108395

SUMMARY OF INVENTION

Technical Problem

When spheres are arranged and moved in a curved path formed by a groove, a cylinder, or the like, a total length of a sphere row changes depending on positions of the spheres in the curved path. For example, when spheres B are filled in a curved path as shown in FIGS. 14A and 14B, since positions of the spheres B are different in FIG. 14A and FIG. 14B, total lengths of the spheres B are slightly different. This is because that a line S1 connecting centers of the spheres B is deviated from a center line S2 of the groove and forms a shortcut, and a shortcut amount thereof changes depending on the positions of the spheres B. That is, total lengths L1 and L2 expand and contract when the sphere row passes through the groove as shown in FIGS. 14A and 14B.

When an infinitely continuous sphere row passes through the curved path, even when the expansion and contraction occur, a sphere B cannot be extended due to the spheres B on the front and the rear, so the sphere B is elastically deformed to counteract the extension. As a result, since the spheres B are pressed and hit one another at a timing of the extension, the sphere row cannot smoothly pass through the curved path. However, since an amount of expansion and contraction changes depending on a curvature radius of the curved path or a length of the curve, the spheres B can smoothly pass through if a curve shape is known to reduce the amount of expansion and contraction.

When the sphere row expands and contracts, at an entrance and an exit of the curved path, an amount of the spheres B which enters the entrance and an amount of the spheres B which exits from the exit are not the same, but differ depending on the expansion and contraction. Therefore, this phenomenon may be referred to as entering-exiting fluctuation, and the amount of expansion and contraction may be referred to as an entering-exiting fluctuation amount.

The internal deflector type ball screw has a structure in which a circulation path having a complicated three-dimensional curve shape is provided inside a circulation internal deflector, and in which a sphere row passes therethrough. That is, as shown in FIGS. 14A and 14B, when a ball return path is drawn in a curve having constant curvature, an entering-exiting fluctuation amount thereof can be obtained by a calculation formula, but since the ball return path of the circulation internal deflector does not include a curve having constant curvature and has a three-dimensional curve shape (see FIG. 2), it is difficult to obtain the entering-exiting fluctuation amount by calculation. As a result, there is a problem that the entering-exiting fluctuation cannot be reduced, and the sphere does not smoothly circulate in the ball return path.

According to the ball screw device described in Patent Document 1, a hole or groove is necessarily provided in the nut so as to fit the circulation internal deflector, and thus there is a production problem that the hole or groove is easily deformed during heat treatment of the nut. Further, since balls in the circulation internal deflector cannot bear a load, a load balance among the respective balls is deteriorated, so a service life of the ball screw device may be reduced.

In the ball screw described in Patent Document 2, it is necessary to reduce the number of balls since the elastic bodies are interposed between the balls. Therefore, a load capacity of the ball screw is reduced. Further, a ball filling operation at the time of assembly becomes complicated, and there is a concern about strength and wear resistance of the elastic bodies which are made of a high-flexibility material, and thus it is difficult to use the ball screw under high-speed rotation conditions.

The present invention is made in view of the above-described problems, and an object of the present invention is to provide a ball screw including a circulation portion which can reduce entering-exiting fluctuation when balls pass through a ball return path.

Solution to Problem

The object of the present invention is achieved by the following configuration.

(1) A ball screw including:
a screw shaft, a spiral screw groove being formed on an outer peripheral surface of the screw shaft;
a nut disposed around the screw shaft, a spiral screw groove being formed on an inner peripheral surface of the nut;

a plurality of balls that are housed in rolling paths formed by the two screw grooves facing each other; and a circulation portion constituting a ball return path for circulating the plurality of balls in one turn or less of the rolling paths, in which the ball return path of the circulation portion is formed so that when a lead is L, a ball diameter is Da, and a lead angle is β, a maximum inclination angle α of the ball return path satisfies any one of the following (c1) to (c3).

$$\alpha = 22.63(L/Da)^2 - 32.17(L/Da) + 27.00 - \beta \pm 5 \quad \text{(c1)}$$

$$\alpha = 5.86(L/Da)^2 + 2.09(L/Da) + 2.45 - \beta \pm 5 \quad \text{(c2)}$$

$$\alpha = 7.24(L/Da)^2 - 23.65(L/Da) + 44.83 - \beta \pm 5 \quad \text{(c3)}$$

(2) The ball screw according to (1), in which the circulation portion includes a circulation internal deflector.

Advantageous Effects of Invention

According to the ball screw of the present invention, the ball return path of the circulation portion is formed so that the maximum inclination angle α of the ball return path satisfies any one of the above (c1) to (c3), and thus it is possible to reduce the entering-exiting fluctuation when the balls pass through the ball return path.

DESCRIPTION OF EMBODIMENT

An embodiment of a ball screw according to the present invention will be described in detail below with reference to the drawings.

Figure 1:
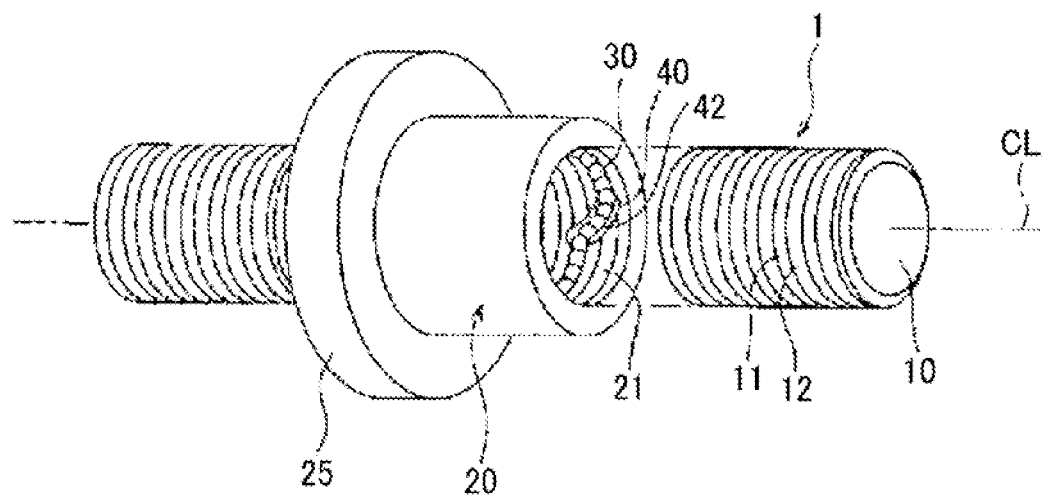
FIG. 1 is a perspective view of a ball screw according to the present invention.
Figure 2:
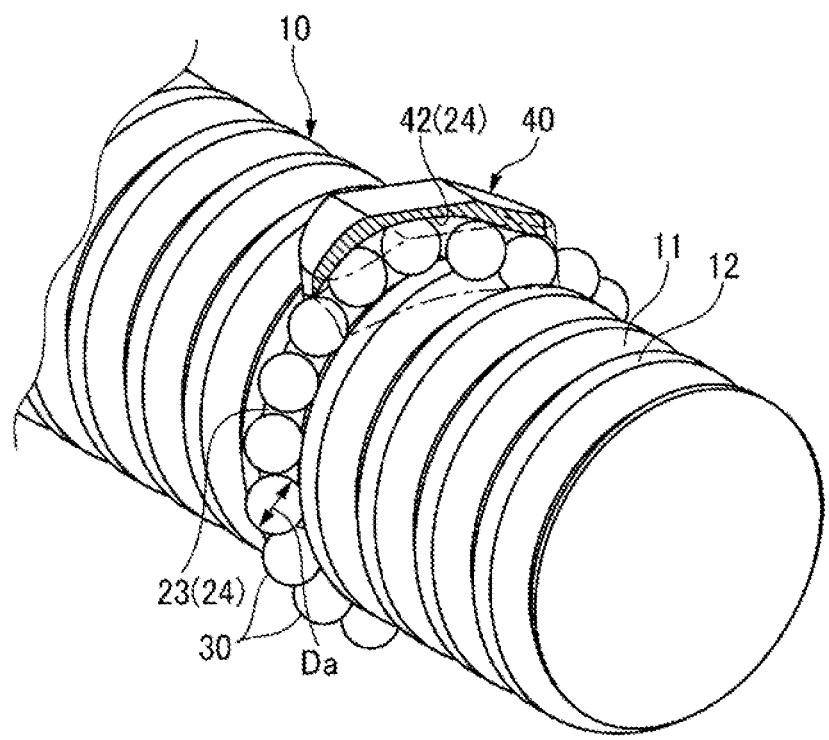
FIG. 2 is a perspective view showing a steel ball row passing through a circulation path, together with a screw shaft and a circulation internal deflector.

FIG. 1 is a perspective view of the ball screw according to the present invention. FIG. 2 is a perspective view showing a steel ball row passing through a circulation path, together with a screw shaft and a circulation internal deflector.

The ball screw 1 includes a screw shaft 10, a nut 20, a plurality of balls 30, and a plurality of circulation internal deflectors 40 as a circulation portion. A spiral first screw groove 11 having a predetermined lead is formed on an outer peripheral surface of the screw shaft 10.

The nut 20 has a substantially cylindrical shape, has an inner diameter larger than an outer diameter of the screw shaft 10, and is externally fitted to the screw shaft 10 with a predetermined gap therebetween. A flange 25 that couples with a guide target is provided at one end portion of the nut 20. An inner peripheral surface of the nut 20 has a lead which is equal to the lead of the first screw groove 11 of the screw shaft 10, and is provided with a second screw groove 21 which faces the first screw groove 11. Rolling paths 23 having a substantially circular cross section are formed by the first screw groove 11 of the screw shaft and the second screw groove 21 of the nut 20. The plurality of balls 30 are rollably filled in the rolling paths 23.

The plurality of circulation internal deflectors 40, that respectively return the balls to rolling paths 23 before, are mounted on the inner peripheral surface of the nut 20. A ball return path 42, which connects one end of a rolling path 23 to another end of another rolling path 23 which is provided one turn before the rolling path 23, is formed in each of the circulation internal deflectors 40. The balls 30 rolling from the rolling paths 23 toward the respective circulation internal deflectors 40 are scooped up in a radial direction of the screw shaft 10 by the ball return paths 42, move over screw threads 12 of the screw shaft 10, and return to the rolling paths 23 one turn before (one lead before), thereby circulating the balls 30.

Substantially annular endless circulation paths 24 are respectively formed outside the screw shaft 10 by the ball return paths 42 and the rolling paths 23. Accordingly, the nut can relatively linearly move in an axial direction of the screw shaft 10 with respect to the screw shaft 10 due to an endless circulation of the plurality of balls 30 in the endless circulation path 24 in accordance with relative rotation of the screw shaft 10 with respect to the nut 20.

Next, each circulation internal deflector 40 will be described in detail with reference to FIGS. 3A to 3C. The circulation internal deflector 40 is a member having a substantially oval shape in a top view, which is formed of, for example, sintered alloy. The substantially S-shaped ball return path 42 is formed on an inner surface of the circulation internal deflector 40. The ball return path 42 has a continuous U shape in which a cross section in a transverse direction of the circulation internal deflector 40 has an inner diameter that is aligned with an outer diameter of the ball 3 from both ends in a longitudinal direction toward a central portion in a longitudinal direction of the circulation internal deflector 40, and forms a groove shape integrally with the substantially S-shaped shape.

An inclination angle formed by a surface S orthogonal to the central axis CL of the screw shaft 10 and the trajectory $T_2$ of the balls 30 in the ball return path 42 becomes a maximum inclination angle $\alpha$ at an internal deflector center C on a route of the circulation internal deflector 40. An angle formed by the trajectory $T_1$ of the balls 30 on the screw shaft and the surface S orthogonal to the central axis CL of the screw shaft 10 is a lead angle $\beta$ of the screw grooves 11 and 21.

Here, as a result of intensive studies, the inventors have established a design of the circulation internal deflector 40 having a small entering-exiting fluctuation by obtaining the entering-exiting fluctuation amount by analysis.

The shape of the ball return path 42 of the circulation internal deflector 40 is substantially determined if the maximum inclination angle $\alpha$ and a curvature radius R of the ball return path 42 are determined. Therefore, the two values are important in design. In the present embodiment, in order to design the ball return path 42 having a small entering-exiting fluctuation by obtaining the maximum inclination angle $\alpha$ and the curvature radius R of the ball return path 42 having a small entering-exiting fluctuation in the ball screw 1 of various specifications, how to set the maximum inclination angle $\alpha$ and the curvature radius R is clarified.

As a result of calculation, in order to reduce the entering-exiting fluctuation amount, it has been found that it is more important to set the maximum inclination angle $\alpha$ to a certain value than the curvature radius R. Details will be described below.

Figure 3C:
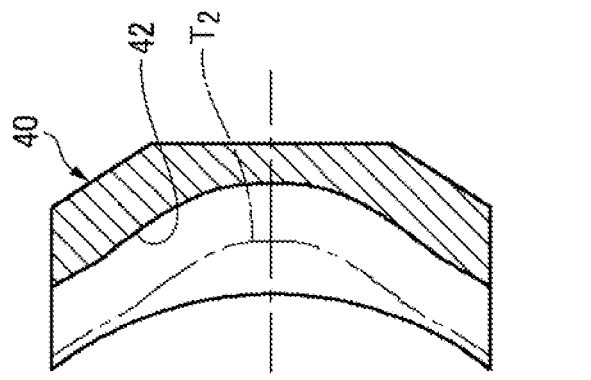
FIG. 3C is a cross-sectional view taken along a center line of the ball return path in FIG. 3A.
Figure 3B:
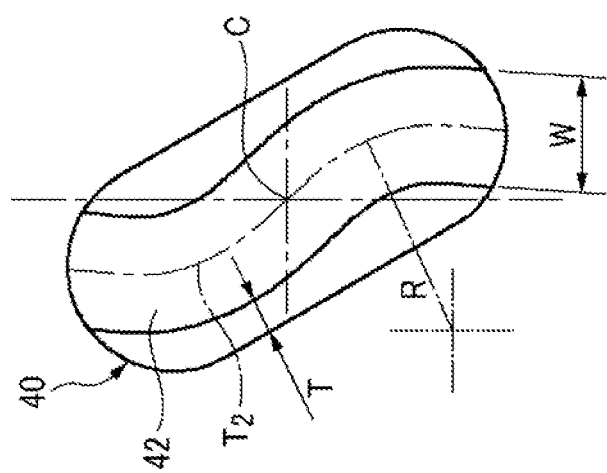
FIG. 3B is a top view showing a shape of the ball return path of the circulation internal deflector.
Figure 4:
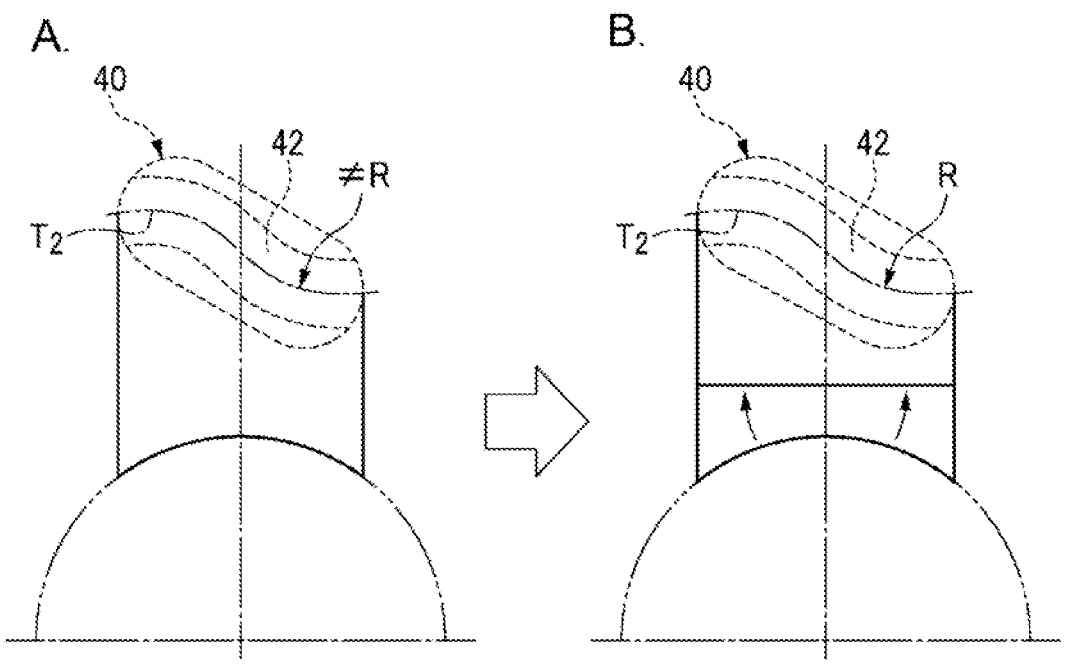
FIG. 4 is an illustrative view showing a curvature radius of the ball return path obtained when the ball return path drawn on a cylindrical surface having the same diameter as a ball center circle is developed in a plane.

Here, the curvature radius R here is not a curvature radius when the ball return path 42 is viewed from a direction shown in FIG. 3B, but is a curvature radius obtained when the ball return path 42 drawn on a cylindrical surface having the same diameter as a ball center circle is developed in a plane as shown in FIG. 4. On the other hand, the maximum inclination angle $\alpha$ is a value obtained by viewing from the direction shown in FIG. 3B.

Figure 5:
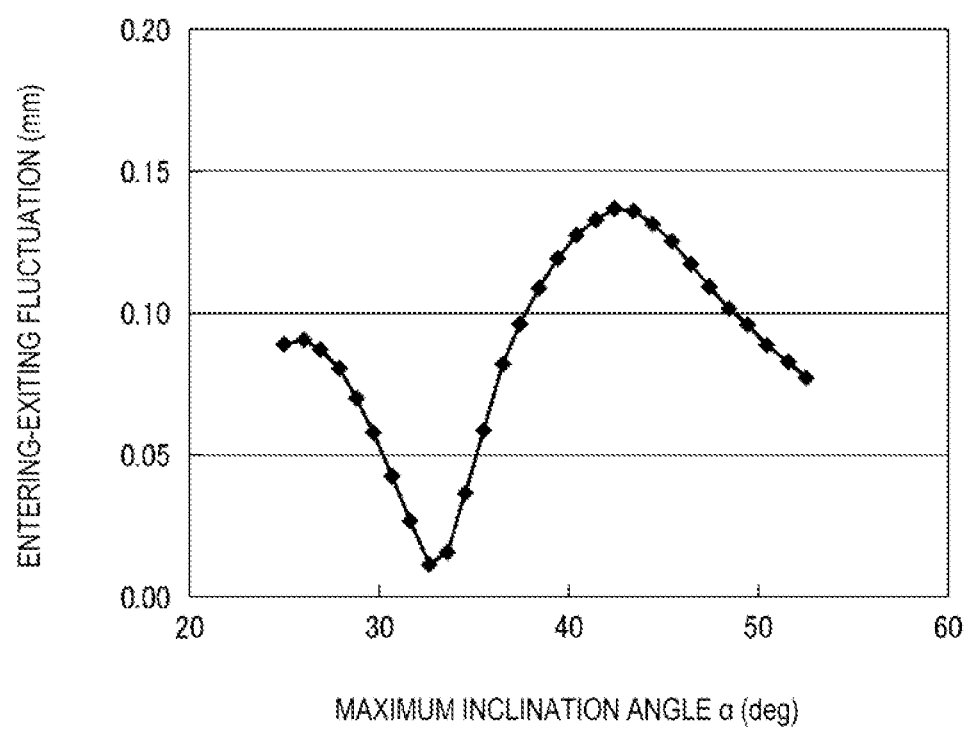
FIG. 5 is a graph showing a relationship between an entering-exiting fluctuation amount and a route angle α at the center of the internal deflector.

First, when the curvature radius R of the ball return path 42 is constant and the maximum inclination angle $\alpha$ of the ball return path 42 is changed to calculate the entering-exiting fluctuation, as shown in FIG. 5, it has been found that the maximum inclination angle $\alpha$ that changes the entering-exiting fluctuation amount and minimizes the entering-exiting fluctuation is present. (In FIG. 5, a is around 32°. In this example, a shaft diameter is 40 mm and the curvature radius R is 12 mm.)

Figure 6:
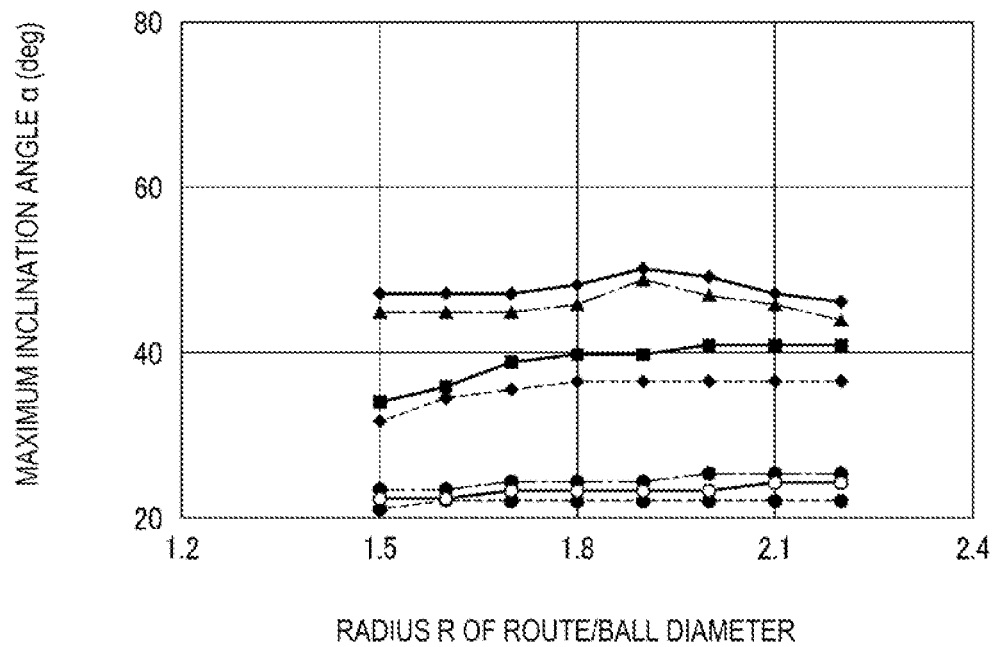
FIG. 6 is a graph showing a maximum inclination angle α that minimizes a route fluctuation when a radius R of the route/a ball diameter Da is changed between 1.5 and 2.2.
Figure 10:
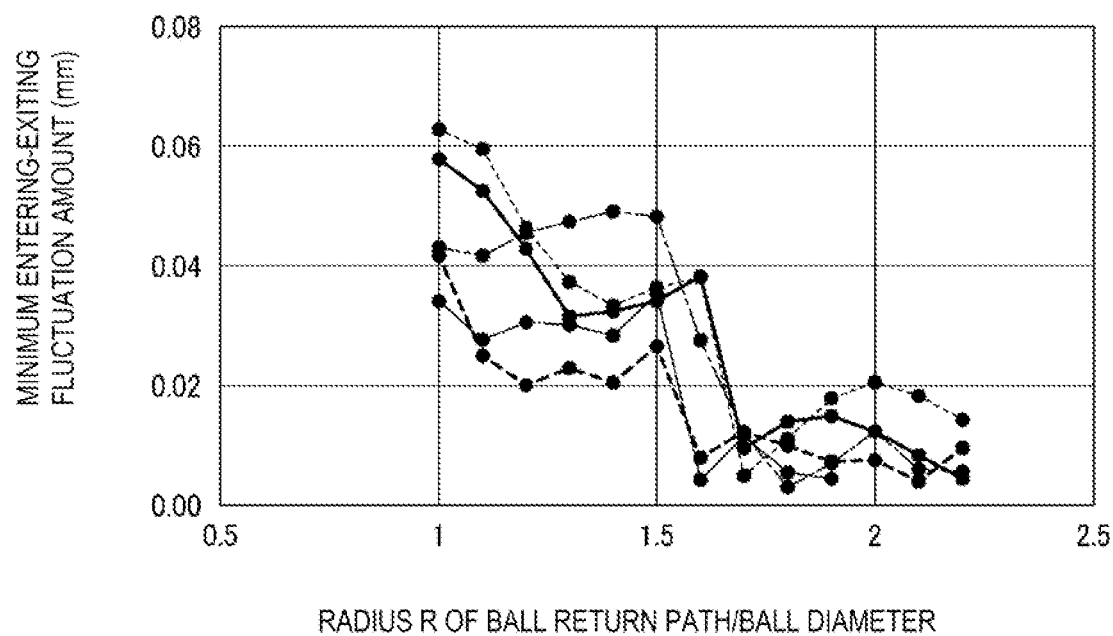
FIG. 10 is a graph showing a relationship between a value of the entering-exiting fluctuation amount when the maximum inclination angle α is set to minimize the entering-exiting fluctuation amount and the radius R of the route/the ball diameter Da.

Next, as shown in FIG. 6, a value R/Da obtained by dividing the curvature radius R of the ball return path 42 with the ball diameter Da is changed between 1.5 and 2.2 in various ball screws having a shaft diameter of 32 mm to 63 mm, and the maximum inclination angle $\alpha$ of the ball return path 42 when the entering-exiting fluctuation is minimized is summarized. The reason why R/Da is changed between 1.5 and 2.2 is that when R/Da is less than 1.5, the entering-exiting fluctuation is difficult to be small as shown in FIG. 10; when R/Da is more than 2.2, a total length of the ball return path 42 is long, and the circulation internal deflector is large.

Figure 7:
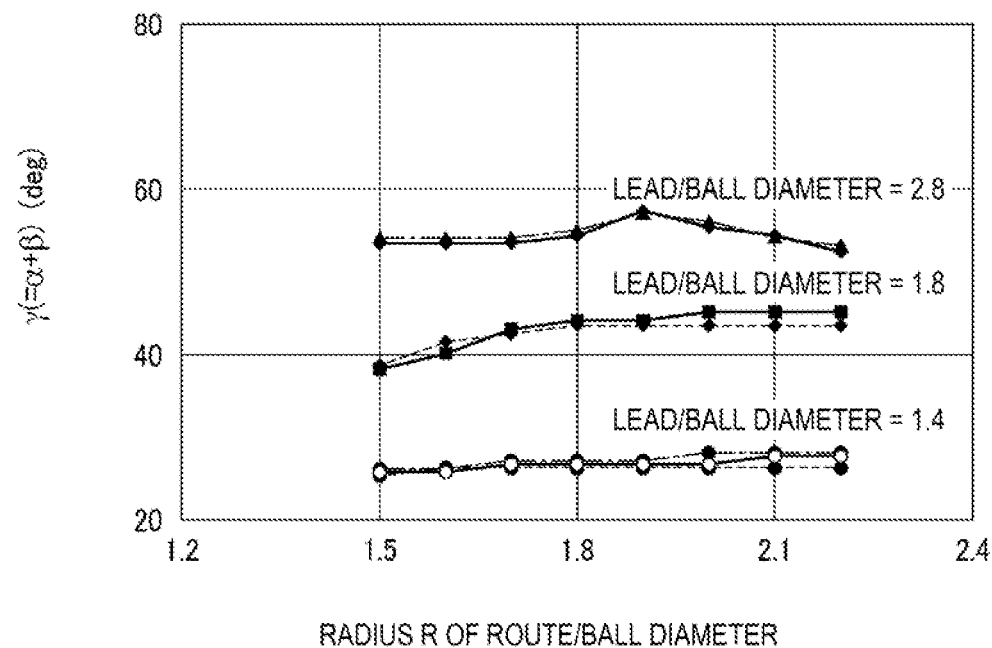
FIG. 7 is a graph showing γ that minimizes a route fluctuation when the radius R of the route/the ball diameter Da is changed between 1.5 and 2.2.

Further, when a vertical axis of FIG. 6 is not the maximum inclination angle $\alpha$ but an angle $\gamma$ ($\gamma=\alpha+$lead angle $\beta$), lines overlap and are divided into three groups as shown in FIG. K. Here, when a common item of the respective groups is confirmed, it has been found that leads/ball diameters of ball screws in which the lines overlap have substantially the same value. FIG. 7 shows the respective leads/ball diameters of the three groups.

From FIG. 6 and FIG. 7, it is found that even if the curvature radius R of the ball return path 42 is changed, the angle $\gamma$ that minimizes the entering-exiting fluctuation is almost unchanged. Since $\gamma=\alpha+$lead angle $\beta$, it is possible to determine the shape of the ball return passage 42 of the circulation internal deflector 40 having the minimum entering-exiting fluctuation in spite of the curvature radius R, as long as the maximum inclination angle $\alpha$ is specified. This indicates that, regardless of the curvature radius R of a curve when the ball return path 42 of the circulation internal deflector 40 is seen in Section A of FIG. 4, the shape of the ball return path 42 having the minimum entering-exiting fluctuation is determined only by the maximum inclination angle $\alpha$.

Further, it has been found that the maximum inclination angles $\alpha$ that minimize the entering-exiting fluctuation are almost the same if the leads/the ball diameters of the ball screws 1 are the same from FIG. 7. For example, in spite of shaft diameters of the ball screws 1 of the following three types A to C, the maximum inclination angles $\alpha$ that minimize the entering-exiting fluctuation are almost the same.

Figure 8:
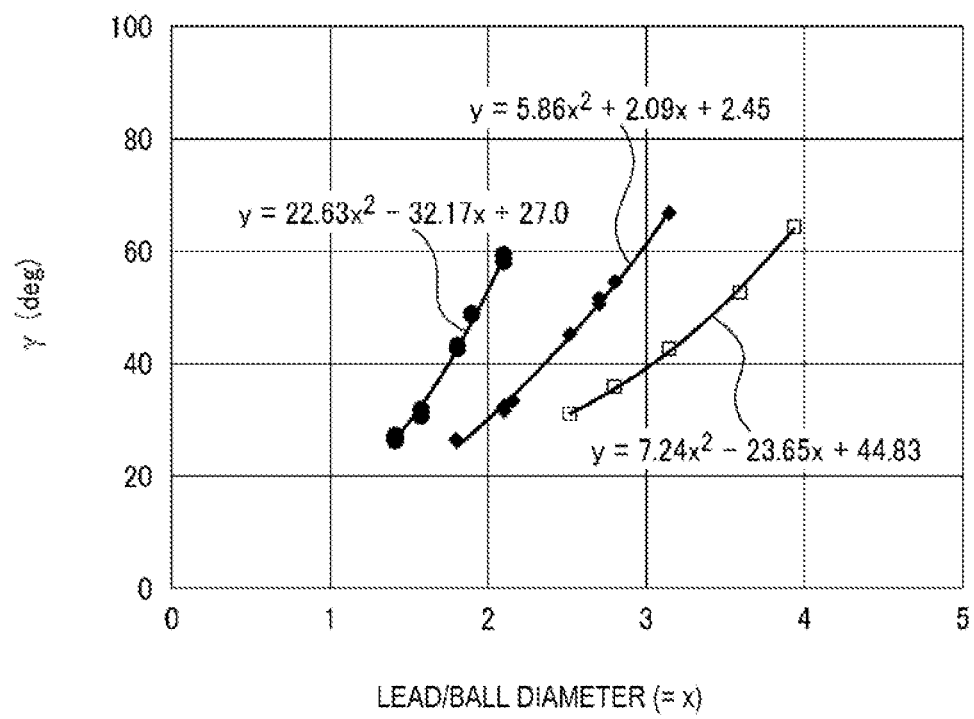
FIG. 8 is a graph showing a relationship between a lead/a ball diameter and γ.

A: lead 20 mm, ball diameter 6.35 mm
B: lead 15 mm, ball diameter 4.7625 mm
C: lead 10 mm, ball diameter 3.175 mm When $\gamma$ is obtained that minimizes the entering-exiting fluctuation of 22 types of ball screws, as shown in FIG. 8, it has been found that $\gamma$ can be expressed by a relationship with the lead/the ball diameter.

Here, as shown in FIG. 7, the maximum inclination angle $\alpha$ that minimizes the entering-exiting fluctuation varies slightly with the curvature radius R. Therefore, in FIG. 8, an average value of the maximum inclination angle $\alpha$ that minimizes the entering-exiting fluctuation obtained when R/Da=1.5 to 2.2 is obtained, and the value of $\gamma$ is calculated from the average value and used.

From FIG. 8, when the circulation internal deflector 40 is designed at the maximum inclination angle $\alpha$ satisfying the following formulae, it is possible to reduce the entering-exiting fluctuation. In the formulae, L represents a lead, and Da represents a ball diameter.

$$\gamma=22.63(L/Da)^2-32.17(L/Da)+27.00 \tag{a1}$$

$$\gamma=5.86(L/Da)^2+2.09(L/Da)+2.45 \tag{a2}$$

$$\alpha=7.24(L/Da)^2-23.65(L/Da)+44.83 \tag{a3}$$

Namely, $$\alpha=22.63(L/Da)^2-32.17(L/Da)+27.00-\beta \tag{b1}$$

$$\alpha=5.86(L/Da)^2+2.09(L/Da)+2.45-\beta \tag{b2}$$

$$\alpha=7.24(L/Da)^2-23.65(L/Da)+44.83-\beta \tag{b3}$$

Figure 9A:
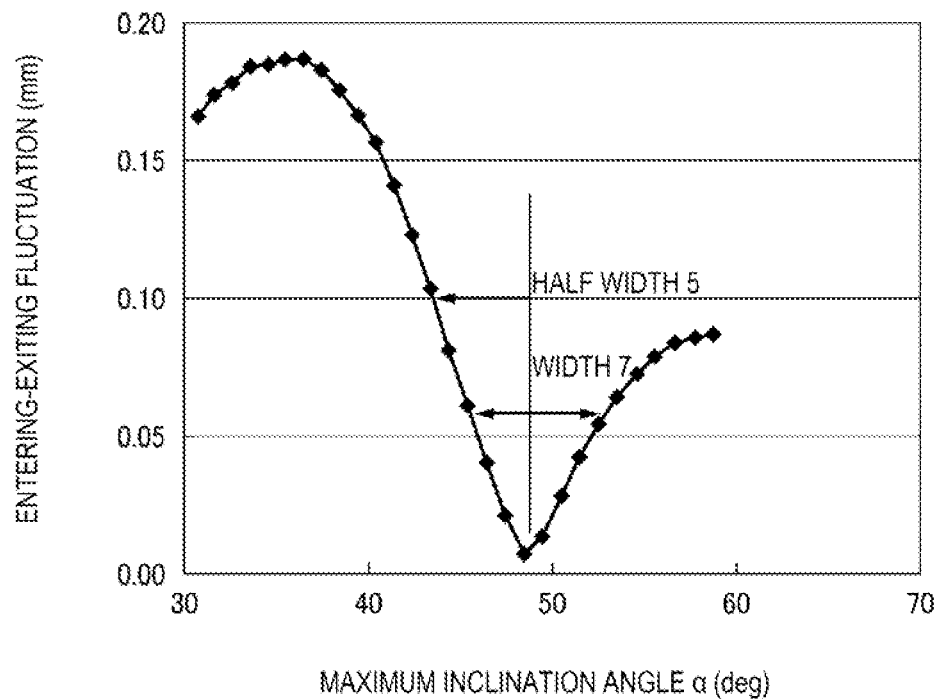
FIG. 9A is a graph showing a relationship between an entering-exiting fluctuation amount and the route angle α at the center of the internal deflector.
Figure 9B:
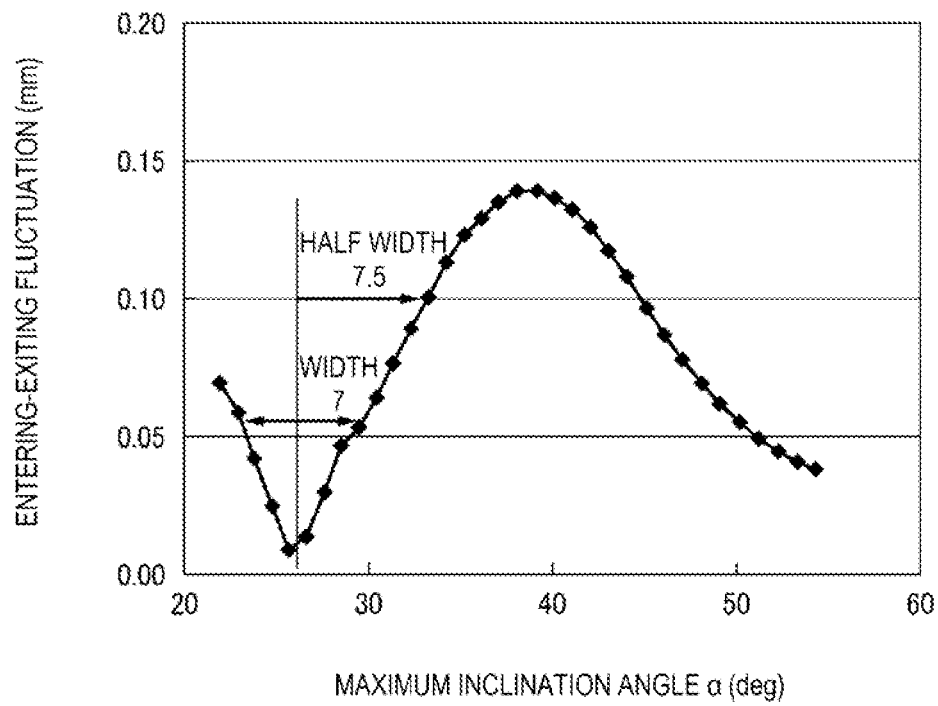
FIG. 9B is a graph showing a relationship between the entering-exiting fluctuation amount and the route angle α at the center of the internal deflector.

Further, it is preferable that the value of the entering-exiting fluctuation amount can be 0.1 mm or less, and it is confirmed that the entering-exiting fluctuation amount can achieve 0.1 mm or less if the value of the maximum inclination angle $\alpha$ that minimizes the fluctuation amount is set in a range of approximately ±5°. As an example, FIG. 9A shows a ball screw having a shaft diameter of 50 mm and a curvature radius R of 12.5 mm, and FIG. 9B shows a ball screw having a shaft diameter of 40 mm and a curvature radius R of 12 mm. Therefore, the following formulae (c1)

to (c3) are given by using the above formulae (b1) to (b3) in order to achieve an entering-exiting fluctuation amount of 0.1 mm or less.

$$\alpha=22.63(L/Da)^2-32.17(L/Da)+27.00-\beta\pm5 \quad (c1)$$

$$\alpha=5.86(L/Da)^2+2.09(L/Da)+2.45-\beta\pm5 \quad (c2)$$

$$\alpha=7.24(L/Da)^2-23.65(L/Da)+44.83-\beta\pm5 \quad (c3)$$

Further, it is more preferable that the entering-exiting fluctuation amount can be set to 0.06 mm or less. Therefore, if ±5° is set to ±3.5° in the above formulae (c1) to (c3) from FIG. 9A and FIG. 9B, 0.06 mm or less can be achieved.

Figure 3A:
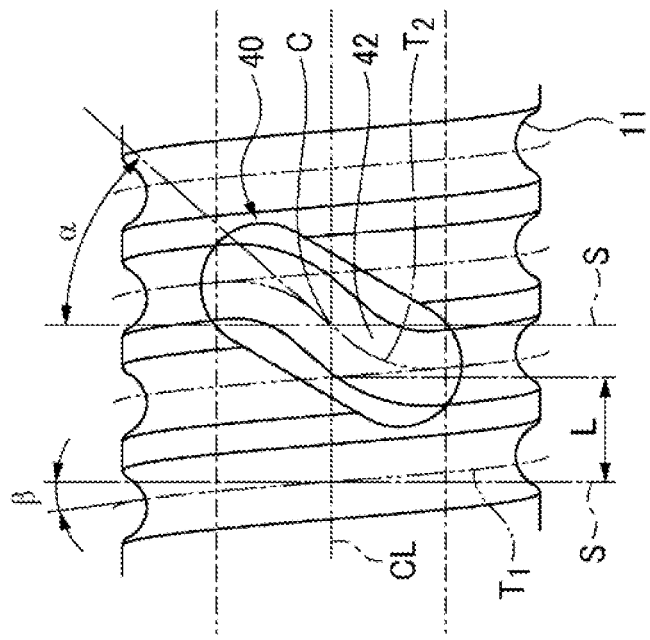
FIG. 3A is a schematic view showing a screw groove of the screw shaft and a ball return path of the circulation internal deflector.

However, the design of the circulation internal deflector 40 has merits that the smaller the maximum inclination angle α, the shorter the total length of the ball return path 42, and a size of the circulation internal deflector 40 can be reduced to be small; conversely, when the maximum inclination angle α is large, a thickness T between the outer periphery of the circulation internal deflector 40 and the ball return path 42 shown in FIGS. 3A to 3C can be increased. Therefore, it is necessary to prioritize the size or the thickness T of the circulation internal deflector 40, and the maximum inclination angle α cannot be set in consideration of only the entering-exiting fluctuation amount in many cases. Therefore, it is realistically considered that the formulae (c1) to (c3) fall within a range of about +5° with respect to the formulae (b1) to b3).

Therefore, in the setting of the maximum inclination angle α, any one of the formulae (c1) to (c3) is selected in consideration of the size of the circulation internal deflector 40, the thickness T between the outer periphery of the circulation internal deflector and the ball return path 42, and the like other than the entering-exiting fluctuation amount.

FIG. 10 shows a relationship between a value of the entering-exiting fluctuation amount when the maximum inclination angle α is set to minimize the entering-exiting fluctuation amount and the curvature radius R of the ball return path 42/the ball diameter Da. It is found from the drawing that when the curvature radius R/the ball diameter Da is 1.5 or more, a smaller entering-exiting fluctuation amount is obtained. From this, it is desirable to set the curvature radius R when the ball return path 42 is viewed from a screw shaft axial direction so that the curvature radius R/the ball diameter Da>1.5 at any part of the ball return path 42.

Figure 11A:
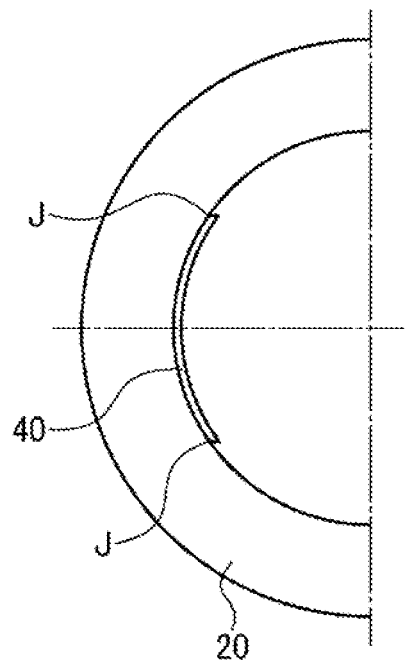
FIG. 11A and FIG. 11B are a side view and an inside cross-sectional view for illustrating a joint of the groove.
Figure 11B:
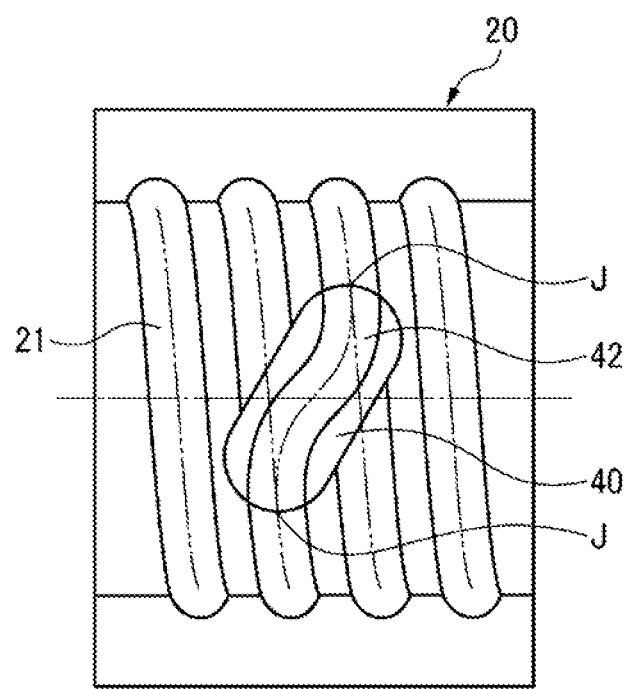
Figure 12:
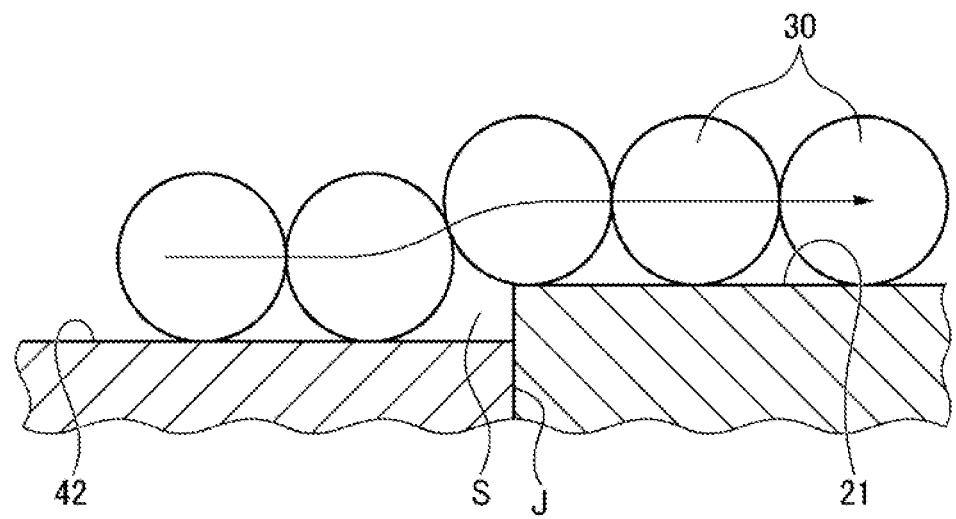
FIG. 12 shows a ball row when there is a step.
Figure 13:
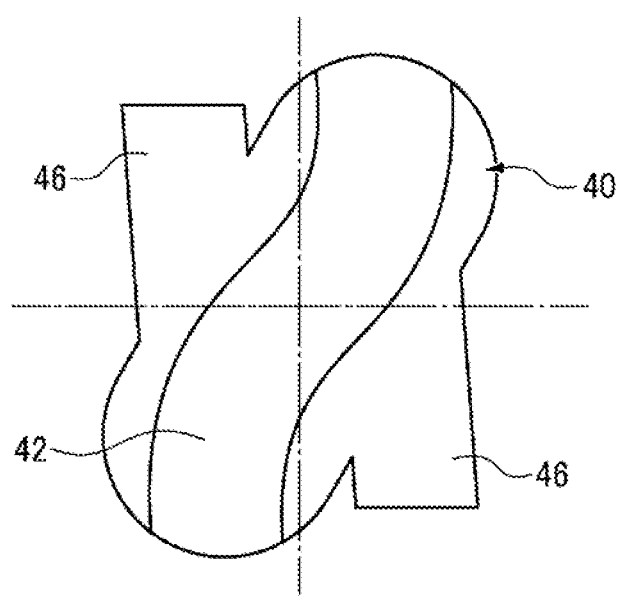
FIG. 13 is a top view of the circulation internal deflector having a protruding portion for positioning.
Figure 14A:
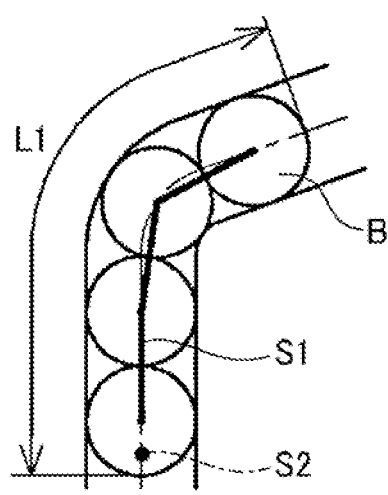
FIG. 14A and FIG. 14B show a change in a total length of a sphere row with respect to positions of spheres.
Figure 14B:
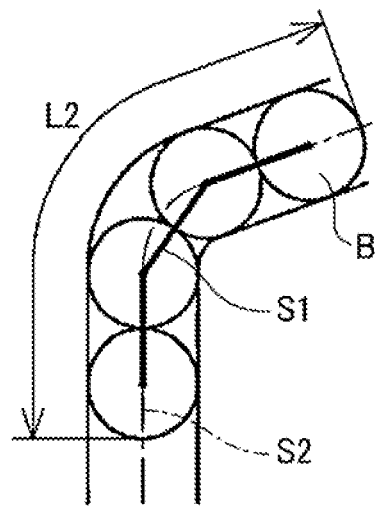

Further, as shown in FIGS. 11A and 11B, when a step s is present at a joint 1 of the ball return path 42 and the second screw groove 21 of the nut 20, this also causes an entering-exiting fluctuation. FIG. 12 shows a ball row in the circulation path when the step s is present at the joint J. Here, in order to reduce the step s of the joint J, it is required to accurately align the circulation internal deflector 40 with the second screw groove 21 of the nut 20. As a method of accurate alignment, for example, as shown in FIG. 13, there is a method of providing a protruding portion 46 for fitting with the nut 20 in the circulation internal deflector 40.

Since the balls 30 are deviated from a center of the ball return path 42 when a width of the ball return path 42 is wider with respect to the balls 30 in the circulation internal deflector 40, a state of the balls 30 becomes unstable, and the trajectory $T_2$ of the balls 30 in the circulation internal deflector 40 is also influenced. As shown in FIG. 3B, in order to align the balls 30 near the center of the ball return path 42 as designed, a width W of the ball return path 42 is desirably the diameter of the ball 30×1.07 or less, more desirably the diameter of the ball 30×1.05 or less.

As described above, the ball screw 1 of the present invention includes: the screw shaft 10, in which the first screw groove 11 is formed on the outer peripheral surface of the screw shaft 10; the nut 20 disposed around the screw shaft 10, in which the second screw groove 21 is formed on the inner peripheral surface of the nut 20; the plurality of balls 30 which are housed in the rolling path 23 formed by the two screw grooves 11 and 21 facing each other; and the circulation internal deflector 40 constituting the ball return path 42 for circulating the plurality of balls 30 in the rolling path 23 of one turn or less. The ball return path 42 of the circulation internal deflector 40 is formed so that when the lead is L, the ball diameter is Da, and the lead angle is β, the maximum inclination angle α of the ball return path 42 satisfies any one of the following (c1) to (c3).

$$\alpha=22.63(L/Da)^2-32.17(L/Da)+27.00-\beta\pm5 \quad (c1)$$

$$\alpha=5.86(L/Da)^2+2.09(L/Da)+2.45-\beta\pm5 \quad (c2)$$

$$\alpha=7.24(L/Da)^2-23.65(L/Da)+44.83-\beta\pm5 \quad (c3)$$

As a result, it is possible to reduce the entering-exiting fluctuation when the balls 30 pass through the ball return path 42.

The present invention is not limited to the embodiment described above, and modifications, improvements, and the like can be made as appropriate.

The ball return paths 42 can be any form, as long as the balls 30 are circulated to the rolling paths 23 less than one turn. For example, in the present embodiment, although the ball return paths 42 are formed by the circulation internal deflectors 40 disposed on the inner surface of the nut 20, the ball return paths 42 are not limited to the circulation internal deflectors 40, and a nut with ball return paths formed integrally on the inner peripheral surface (see JP-A-2003-307263) may constitute a circulation portion. In this case, since the ball return paths are integrated with the nut, the ball return paths and the screw groove of the nut are formed without level difference, and thus the balls 30 are not stuck at a step by the level difference and a smooth operation can be realized.

The ball return paths may separate the balls from the outer peripheral surface of the screw shaft, and the balls 30 may be circulated only by the circulation internal deflectors (see JP-A-1993-10412). The ball return paths may be formed in a tunnel shape (see JP-B-4462458). The circulation internal deflectors may have a tongue portion that extends into the screw groove of the screw shaft.

This application is based on Japanese Patent Application No. 2018-083390 filed on Apr. 24, 2018, the contents of which are incorporated herein by reference.

REFERENCE SIGNS LIST

1. Ball Screw
10. Screw Shaft
11. First Screw Groove (Screw Groove)
20. Nut
21. Second Screw Groove (Screw Groove)
23. Rolling Path
30. Ball
40. Circulation Internal Deflector (Circulation Portion)
42. Ball Return Path
Da. Ball Diameter
L. Lead
R. Curvature Radius of Ball Return Path
S. Surface Perpendicular to Axial Direction of Screw Shaft α. Angle at Internal Deflector Center on Route of Ball Return Path (Maximum Inclination Angle)
β. Lead Angle of Screw Groove

The invention claimed is:

1. A ball screw comprising:
a screw shaft, a spiral screw groove being formed on an outer peripheral surface of the screw shaft;
a nut disposed around the screw shaft, a spiral screw groove being formed on an inner peripheral surface of the nut;
a plurality of balls that are housed in rolling paths formed by the two screw grooves facing each other; and
a circulation portion constituting a ball return path for circulating the plurality of balls in one turn or less of the rolling paths, wherein
the ball return path of the circulation portion is formed so that when a lead is L, a ball diameter is Da, and a lead angle is β, a maximum inclination angle α of the ball return path satisfies any one of the following (c1) to (c3)

$$\alpha = 22.63(L/Da)^2 - 32.17(L/Da) + 27.00 - \beta \pm 5 \quad \text{(c1)}$$

$$\alpha = 5.86(L/Da)^2 + 2.09(L/Da) + 2.45 - \beta \pm 5 \quad \text{(c2)}$$

$$\alpha = 7.24(L/Da)^2 - 23.65(L/Da) + 44.83 - \beta \pm 5 \quad \text{(c3)}.$$

2. The ball screw according to claim 1, wherein the circulation portion includes a circulation internal deflector.

* * * * *